CLARK OSGOOD.

Improvement in Street-Scraper.

No. 126,570. Patented May 7, 1872.

Witnesses:

Inventor
Clark Osgood
per Alexander F. Mason
Attorneys.

126,570

UNITED STATES PATENT OFFICE.

CLARK OSGOOD, OF CAPE ELIZABETH, ASSIGNOR TO THEODORE RIPLEY, OF MANCHESTER, MAINE.

IMPROVEMENT IN STREET-SCRAPERS.

Specification forming part of Letters Patent No. 126,570, dated May 7, 1872; antedated April 24, 1872.

*To all whom it may concern:*

Be it known that I, CLARK OSGOOD, of Cape Elizabeth, county of Cumberland and State of Maine, have invented certain new and useful Improvements in "Street-Scrapers;" and do hereby declare that the following is a full, clear, and exact description thereof, reference being had to the annexed drawing forming a part of this specification, in which—

Figure 1:
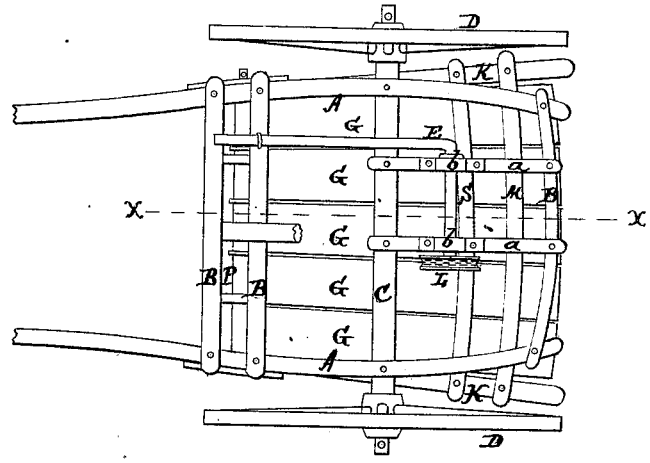
Figure 2:
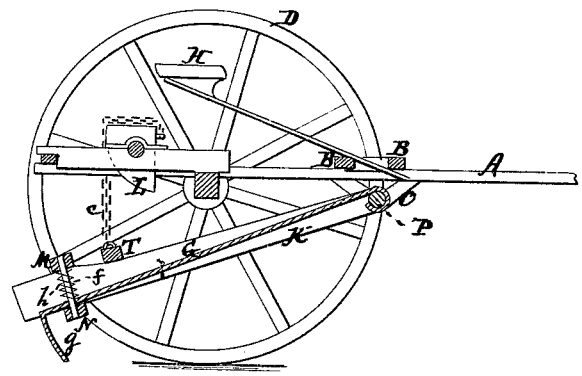

Figure 1 represents a plan view, and Fig. 2 a cross-section taken through line $x\ x$, Fig. 1.

Like letters of reference indicate like parts.

The nature of my invention consists in the construction of a machine for scraping the dirt and dust from streets, as will be more fully hereinafter set forth.

In the accompanying drawing, C represents an ordinary axle mounted upon wheels D D. Upon the top of this axle is built a frame, composed of the cross-bars B B, connected to two longitudinal bars, A A, which form the shafts for the horses. Under the two front cross-bars B B are two downward-projecting V-shaped metallic journal-bearings, O O, one placed on each side of the machine. Extending from one of the said bearings to the other is an iron or other metallic rod, P, which also passes through the forward part of a frame composed of the side bars K K and cross-bars S, M, and T, which is free at its rear end, and moves up and down on the rod P as a hinge therefor. Between the upper bars M T and the lower bar S, and between the two side bars K K of this frame, is a series of flat metallic plates, G, which are bent downward, as shown at $g$, Fig. 2, and form scrapers for scraping the dirt as the machine is propelled forward. These plates are each bent around the rod P at their front ends, and act on said hinge-rod in an independent manner. Extending from the cross-bar M to the cross-bar N of the frame, and through each plate G, is a small rod, $f$, encircled by a coil-spring, $h$, which is secured between the two bars so that each plate can be raised the distance between the bars if any obstacle comes in contact with the bent finger $g$, while the recoil of the spring after passing the obstacle will force the plate to its normal position, and in line with the other plates. In bearings $b\ b$, formed on the upper and stationary frame A B, is journaled an L-shaped lever, E, to the end of which is secured a quadrantal-shaped pulley, L. $c$ represents a chain or rope, one end being attached to the quadrant and the other to the bar T of the hinged frame. By turning this lever the entire frame, with the plates, is raised from the ground, so that the machine may be allowed to operate or not, as may be desired. H represents the driver's seat, which is so situated that the driver may move the lever to raise or lower the frame. In some cases I may attach a suitable brush or brushes to the rear of the hinged frame for sweeping the streets.

In the operation of my machine the same is drawn forward, with the fingers $g$ of the scraper-plates resting on the ground, which will drag the dirt and dust in piles or rows until a sufficient quantity is collected, when the driver elevates the frame by the lever, cam, and chain, until the hinged fingers pass over the pile thus collected, when the frame is again allowed to drop and the operation continued. Each scraper, by it construction and arrangement, will clear small obstructions, and to pass over large ones the entire frame is raised.

Having thus fully described my invention, what I claim as new, and desire to secure by Letters Patent, is—

The combination, with the frame A B mounted upon the axle C and wheels D D, of the hinged frame K K, M, N, and T, and the series of independently-hinged plates G, with scrapers $g$, rods $f$, and springs $h$, the scrapers having each independent and limited motion in the frame, and said frame and plates being raised and lowered by the chain or rope $c$, quadrant L, and lever E, all substantially as and for the purposes set forth.

CLARK OSGOOD.

Witnesses:
WM. FRANKLIN SEAVEY
GEO. E. BIRD.